United States Patent [19]

Horvath

[11] 4,290,622
[45] Sep. 22, 1981

[54] HINGE UNIT FOR ARTICULATED VEHICLES

[75] Inventor: Tibor Horváth, Györ, Hungary

[73] Assignee: Magyar Vagon- es Gepgyar, Gyor, Hungary

[21] Appl. No.: 927,933

[22] Filed: Jul. 25, 1978

[30] Foreign Application Priority Data

Aug. 15, 1977 [HU] Hungary .............................. MA 2903

[51] Int. Cl.³ .......................................... B62D 53/02
[52] U.S. Cl. ..................................... 280/400; 280/492
[58] Field of Search ................ 280/400, 492; 180/139, 180/51, 14 R

[56] References Cited

U.S. PATENT DOCUMENTS

| | | | |
|---|---|---|---|
| 2,362,262 | 11/1944 | French | 280/492 X |
| 3,179,440 | 4/1965 | Bumby | 280/492 |
| 3,240,285 | 3/1966 | Finneman | 180/51 |
| 3,433,502 | 3/1969 | Omon | 280/400 |
| 3,912,300 | 10/1975 | Bryan | 280/400 |
| 3,951,435 | 4/1976 | Greatbatch | 280/492 X |
| 4,119,165 | 10/1978 | Bowra | 280/492 X |

*Primary Examiner*—John A. Pekar
*Attorney, Agent, or Firm*—Young & Thompson

[57] ABSTRACT

In a hinge unit which connects the members of articulated power vehicles such as tractors and which permits mutual pivotal movements of such members about a vertical and a horizontal axis, a front member is attached to a forward portion of the vehicle and a rear member is attached to a trailing portion of the vehicle while the front member and the rear member are interconnected by an intermediate member which is supported by a pair of bearings defining a vertical axis on the front member and by another pair of bearings defining a horizontal axis on the rear member, all three members forming together a universal or cardan joint.

4 Claims, 7 Drawing Figures

HINGE UNIT FOR ARTICULATED VEHICLES

This invention relates to hinge units for articulated power vehicles and more particularly for connecting their frame structures.

BACKGROUND OF THE INVENTION

1. Field of the Invention

As is known, articulated power driven vehicles are used as tractors or prime movers in the earth-moving industry and agriculture. They comprise a front frame structure and a rear frame structure interconnected by a hinge unit which permits mutual pivotal movements of the interconnected parts for relative steering articulation about a substantially vertical axis and a relative oscillation about a substantially horizontal axis. Each frame structure is equipped with non-dirigibly mounted ground-engaging wheels and both or one of them may have power plants mounted thereon which are connected through a power train to the wheels of the vehicle. The latter is steered by means of steering jacks in the form of hydraulic rams mounted on the front frame structure and acting on the rear one. Such articulated power vehicles are described in U.S. Pat. No. 3,157,239 which is hereby incorporated by reference.

2. Description of the Prior Art

In known vehicles of this type the hinge unit which connects or suspends adjacent ends of the two frame structures, has some adverse effect upon operation of the vehicle in that mutual angular displacements around a horizontal axis in connection with mutual angular displacements around a vertical axis due to steering operations and articulations generate forces, the action lines of which lie in different planes and point in different directions, especially if both frame structures are equipped with individual power plants. Moreover, the forces may have vertical components which would entail an uneven distribution of weight on and, thereby, spinning of the ground-engaging wheels.

SUMMARY OF THE INVENTION

The main object of the invention is to provide an improved hinge unit for articulated vehicles of the above described type which permits a better control of forces generated by steering operations and by traversing irregular terrain, and which is, in addition, more flexible and less voluminous than the hinge units of the prior art.

Obviously, angular displacements around two axes require several bearings. In prior art structures, the bearings for angular displacement around a horizontal axis are both on the same side of the vertical axis of angular displacements the bearings of which are, as a rule, supported by the front frame structure of the articulated vehicle. Thus, the bearings for angular displacements around a horizontal axis are, as it were, entirely downstream of the vertical axis for angular displacements. This applies even if, instead of bearings, a large size tubular axle is employed the entire length of which lies then downstream the vertical axis.

The invention provides a more symmetrical arrangement of the bearings which, on the one hand, improves the controllability of forces and, on the other hand, increases the flexibility of the hinge unit and diminishes its weight and space requirement.

According to the basic idea of the invention, this is obtained by the provision of an intermediate member which is suspended between the front frame structure and the rear frame structure in the manner of a universal or cardan joint. Suspension of an intermediate member between adjacent frame structures of an articulated vehicle in the manner of a universal or cardan joint means a basic rearrangement of the bearings associated with the vertical and horizontal axes of mutual pivotal movements of the frame structures. Thus, the hinge unit according to the invention is composed of conventional elements in a new combination. Otherwise, it serves, in a known manner, to connect the front frame structure with the rear frame structure of an articulated power vehicle. It permits, likewise in a conventional manner, mutual angular displacements of the frame structures about a vertical axis and a horizontal axis which are at right angles with respect to one another. Furthermore, the new hinge unit comprises a front member and a rear member connectable to or being integral with the front frame structure and the rear frame structure, respectively. The aforesaid intermediate member is supported by two pairs of bearings. One pair of bearings is mounted on the front member along the vertical axis of mutual horizontal angular displacements of the frame structures. The other pair of bearings is supported by the rear member and is aligned along the horizontal axis of mutual vertical angular displacements.

The new feature of the hinge unit according to the invention by which it is distinguished over the prior art consists in that the bearings associated with the horizontal axis of mutual vertical displacements lie, in contrast to conventional arrangements, on opposite sides of the vertical axis of mutual horizontal angular displacements. Such opposite arrangement of the bearings associated with the horizontal axis of mutual angular displacements of the frame structures means that all bearings are located on opposite sides of a common virtual point which, in an ideal case, is the point of intersection of the vertical and horizontal axes of mutual angular displacements. This is just the gist of a universal or cardan joint which is distinguished by relatively short arms of forces and mutually approached centers of gravity with consequently small operational resistances and increased mechanical stability. Thus, operational conditions of articulated power vehicles provided with the new hinge unit greatly improve with respect to conventional specimens. Especially with heavy duty prime movers of large sizes a hinge unit according to the invention has the advantage of relatively small space requirements and reduced weight which results, in addition to a reduction of dimensions, in an improved steerability and the possibility of taking sharper turns of the vehicle on relatively shorter radii.

Moreover, steering jacks of shorter arms may be employed which are operated within narrower angular limits. Accessibility is also improved because of the symmetric nature of the arrangement.

BRIEF DESCRIPTION OF THE DRAWINGS

Further details of the invention will be described by taking reference to the accompanying drawings which show an exemplified embodiment of the hinge unit according to the invention in connection with an articulated power vehicle and in which.

DESCRIPTION OF THE PREFERRED EMBODIMENT

Figure 1:
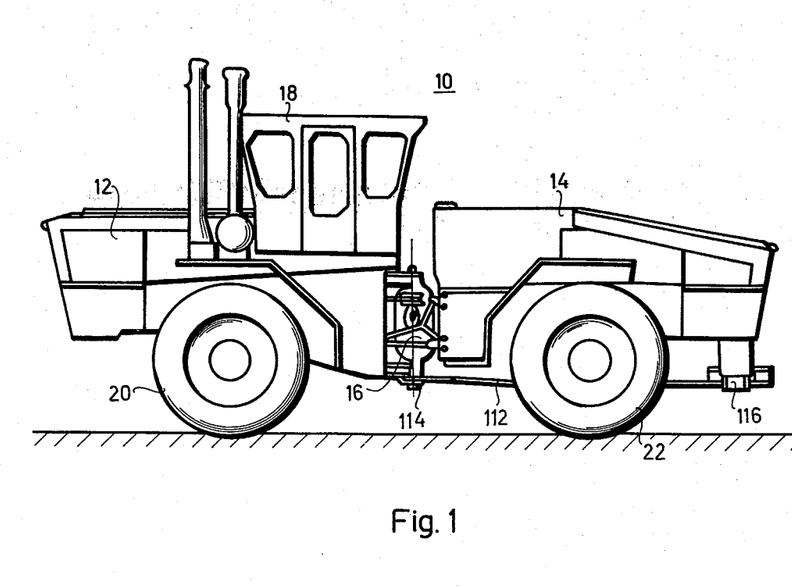
FIG. 1 is a front elevational view of an articulated power vehicle provided with a hinge unit according to the invention.

Referring now to the drawings and more specifically to FIG. 1, reference numeral 10 designates generally an articulated power vehicle such as a tractor. The vehicle 10 includes a front frame structure 12 and a rear frame structure 14 which are joined together for articulated swinging movement relative to each other about substantially vertical and horizontal axes. The means for swingably interconnecting the front and rear structures consists in a hinge unit 16 designed in compliance with the invention details of which will be described hereinafter. As will be clear from FIG. 1, each of the frame structures 12 and 14 is substantially symmetrical except that the front frame structure 12 is equipped with an operator's cabin or compartment 18. Reference numerals 20 and 22 designate non-dirigibly mounted rubber tyred ground engaging wheels carrying the front frame structure 12 and the rear frame structure 14, respectively, in a conventional manner.

A not represented steering wheel in the operator's cabin or compartment 18 actuates means to produce relative pivoting movement between the front and rear frame structures 12 and 14, respectively, around a vertical axis. In the instant case, such means comprises a pair of similar hydraulic rams or steering jacks best shown in FIG. 3 and each including a cylinder 24 and 26, and a piston rod 28 and 30, respectively, which are extensible and retractable relative to their cylinders. Each of the cylinders 24 and 26 is pivotally connected by a pivot pin 32 and 34 to one of a pair of brackets 36 and 38, respectively, which are rigidly secured to and project laterally from the sides of the front frame structure 12 adjacent the rear portion thereof. The outer ends of the piston rods 28 and 30 are pivotally connected by pivot pins 40 and 42 to pairwise arranged ears 44 and 46, respectively, which are affixed to and project laterally outwardly from the hinge unit 16.

The steering jacks 24, 28 and 26, 30 are of the double acting type and are supplied with hydraulic fluid from a suitable reservoir preferably carried by the front frame structure 12. It will be seen that the piston rods 28 and 30 of both steering jacks 24, 28 and 26, 30, respectively, will perform opposite movements in response to turning of the aforesaid steering wheel thus producing relative swinging movement of the frame structures 12 and 14 about a vertical axis referred to above.

Figure 2:
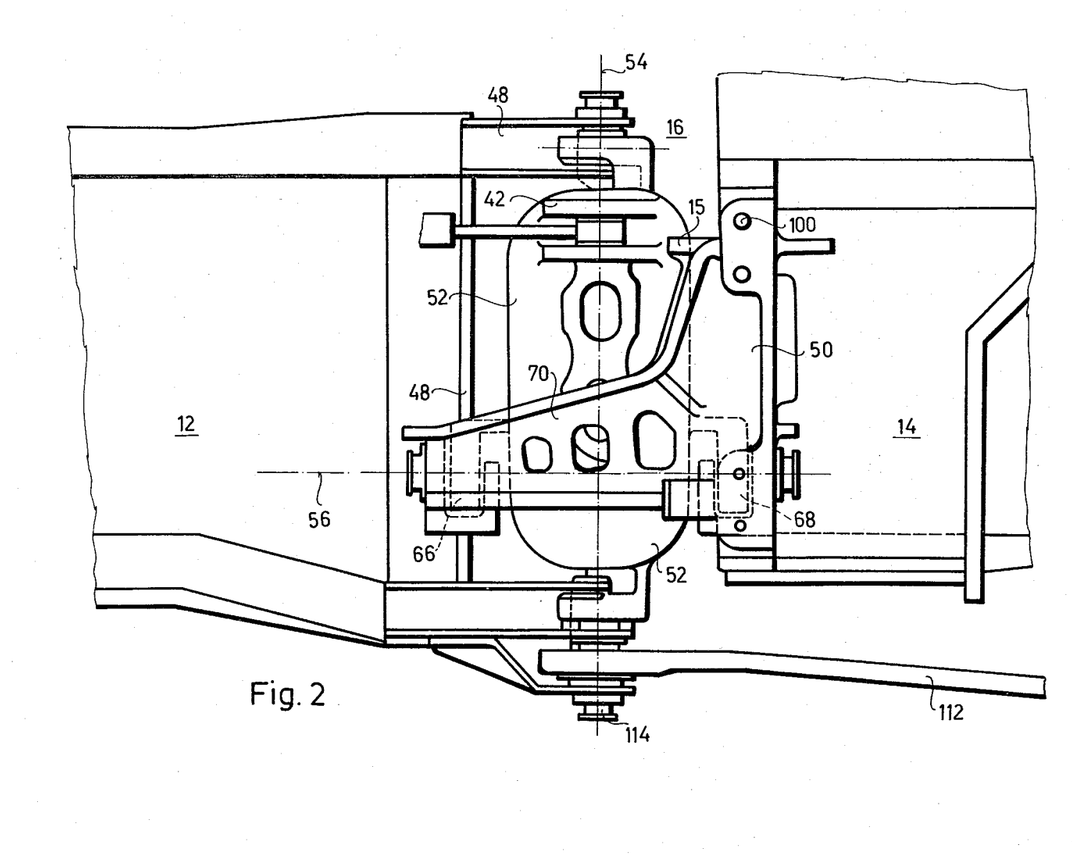
FIG. 2 shows a side elevational view of the new hinge unit on an enlarged scale.
Figure 4:
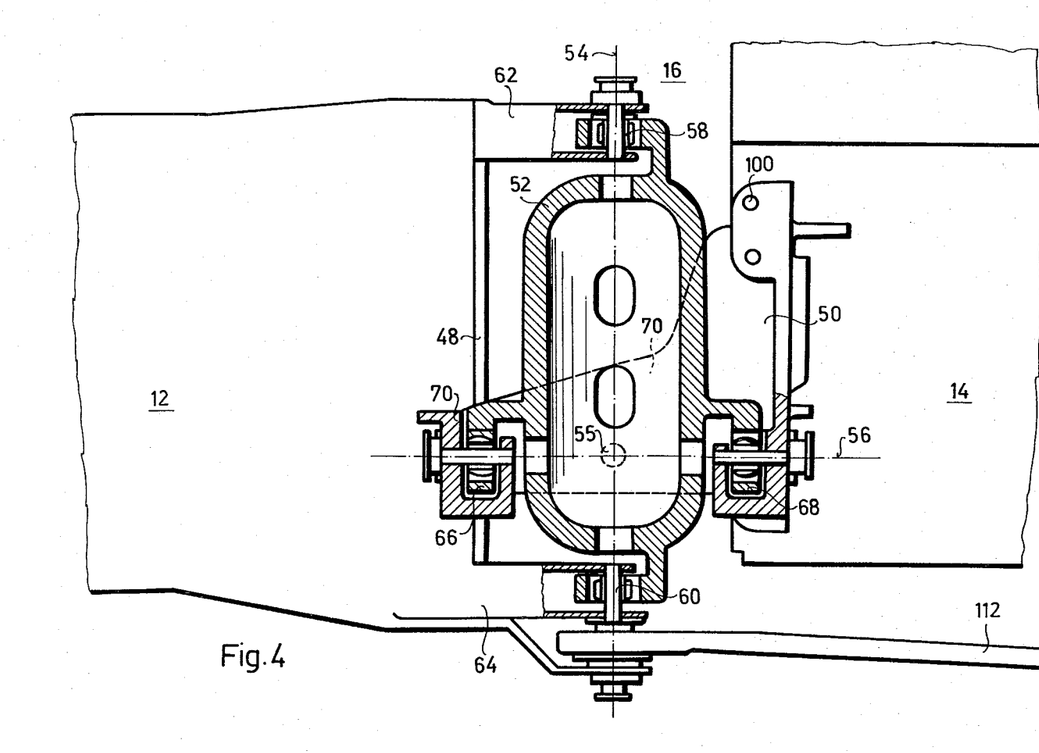
FIG. 4 is a longitudinal sectional view taken along line IV—IV in FIG. 3.

Details of the hinge unit 16 will be seen in FIGS. 2 and 4.

The hinge unit 16 includes a front member 48, a rear member 50 and an intermediate member 52 which are connected to and supported by each other in the manner of a universal or cardan joint. Such joint permits mutual pivotal movements of its front and rear members and thereby, in the instant case, of the frame structures 12 and 14 around a vertical axis 54 and a horizontal axis 56.

With the represented embodiment, both axis 54 and 56 intersect one another in a virtual point of intersection 55. Such arrangement has the advantage of an absolute symmetry as regards angular displacements of the steering wheel and of the forces generated thereby. Obviously, optimum dimensional relations may then be obtained.

For the suspension of the intermediate member 52 in the front and rear members 48 and 50, respectively, ball-and-socket type bearings are employed which are arranged pairwise along the axes 54 and 56. More particularly two such bearings 58 and 60 are located along the vertical axis 54 and joined to brackets 62 and 64, respectively, of the front member 48. In a similar manner, bearings 66 and 68 are arranged along the horizontal axis 56 of which bearing 66 is supported by a yoke shaped bracket 70 of the rear member 50 while bearing 68 is supported by the main body thereof.

Figure 5:
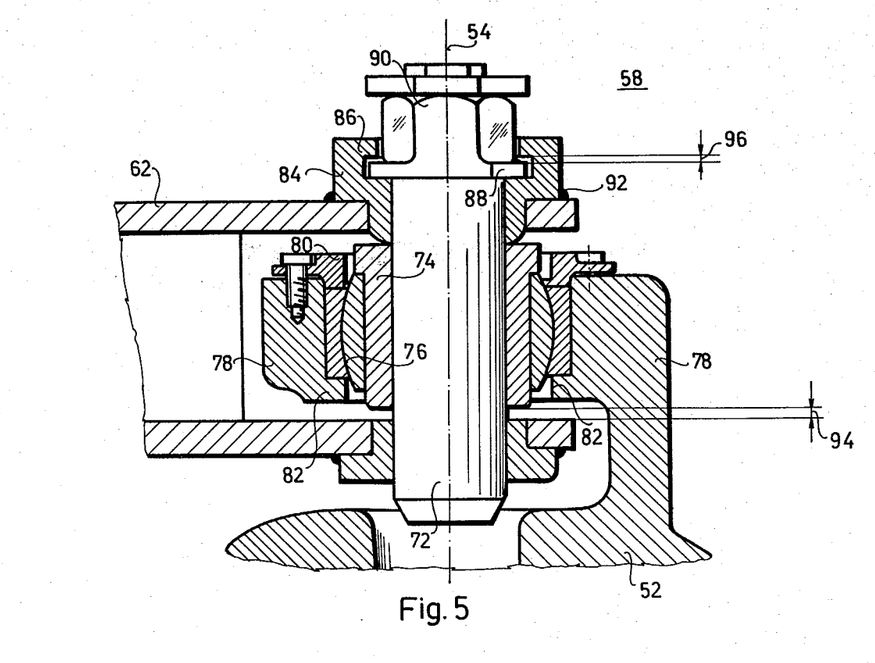
FIGS. 5 and 6 show details of FIG. 4 on a still larger scale.
Figure 6:
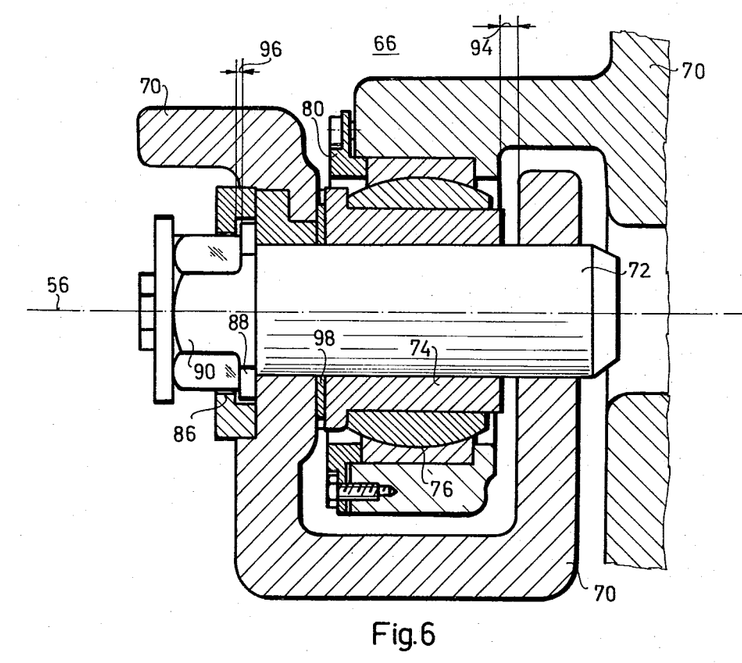

Details of the bearings and their supporting structures as shown in FIGS. 5 and 6 which show longitudinal sectional views of bearings 58 and 66, respectively.

In FIG. 5 reference numberal 72 designates a pivot pin which, together with a similar pivot pin of bearing 60, define the vertical axis 54 of mutual horizontal angular displacements of the frame structures 12 and 14. Pivot pin 72 carries a sleeve 74 which encloses a ball-and-socket joint 76 with a bracket 78 of the intermediate member 52. Joint 76 is fixed in its place by a sort of lid 80. Axial forces are transmitted by a shoulder 82 of the bracket 78 on the ball-and-socket joint 76 and from these to the sleeve 74 which abuts against a ring 84 with an inwardly protruding flange 86. The flange 86 cooperates with a flange 88 of a screw nut shaped portion 90 of the pivot pin 72. Ring 84 is fixed to the bracket 62 of the front member 48 by means of welding as indicated at 92. Clearances 94 and 96 between bracket 62 and sleeve 74, on the one hand, and, on the other hand, between flange 88 and flange 86 ensure suitable backlashes to prevent that both bearings 58 and 60 be loaded simultaneously by axial force.

The bearing 66 represented in FIG. 6 is practically of the same design as bearing 58 just discussed. Therefore, similar details have been designated by the same reference numerals in both illustrations. A washer 98 together with clearances 94 and 96 ensure that axial forces may load bearing 66 in one direction only. An opposite arrangement with bearing 68 acts in a reverse sense.

In other words, as shown in the drawings, clearance 94 is larger than clearance 96. The clearances 94 and 96 of bearings 58 and 60 are arranged in mirror image relation to each other on opposite sides of a plane perpendicular to axis 54; whilst the clearances 94 and 96 of bearings 66 and 68 are also arranged in mirror image relation to each other on opposite sides of a plane perpendicular to axis 56, thereby to prevent both bearings of the same pair of bearings from being loaded by axial forces simultaneously.

It will be apparent that, in the instant case, the front member 48 is integral with the front frame structure 12 while rear member 50 is detachably fixed to rear frame structure 14 by means such as screws 100. Such arrangement is obviously preferable for technological reasons. However, it is possible to fix front member 48 in a similarly detachable manner to front frame structure 12 or to make both members 48 and 50 integral with the frame structures 12 and 14, respectively, associated therewith.

With the represented embodiment, the front member 48 carries at its bottom end a traction bar 112 arranged for pivotal movements around the vertical axis 54 by means of a pivot pin 114. The far end of traction bar 112 is fixed to the rear end of rear frame structure 14 as indicated at 116 in FIG. 1. Such connection has the double advantage of relieving the hinge unit 16 of horizontally acting traction forces and, in the instant case, of ensuring that traction forces will attack the hinge unit 16 at its vertical axis 54 and, thus, are unable to generate articulating movements by which steering operations would undesirably be influenced.

Figure 3:
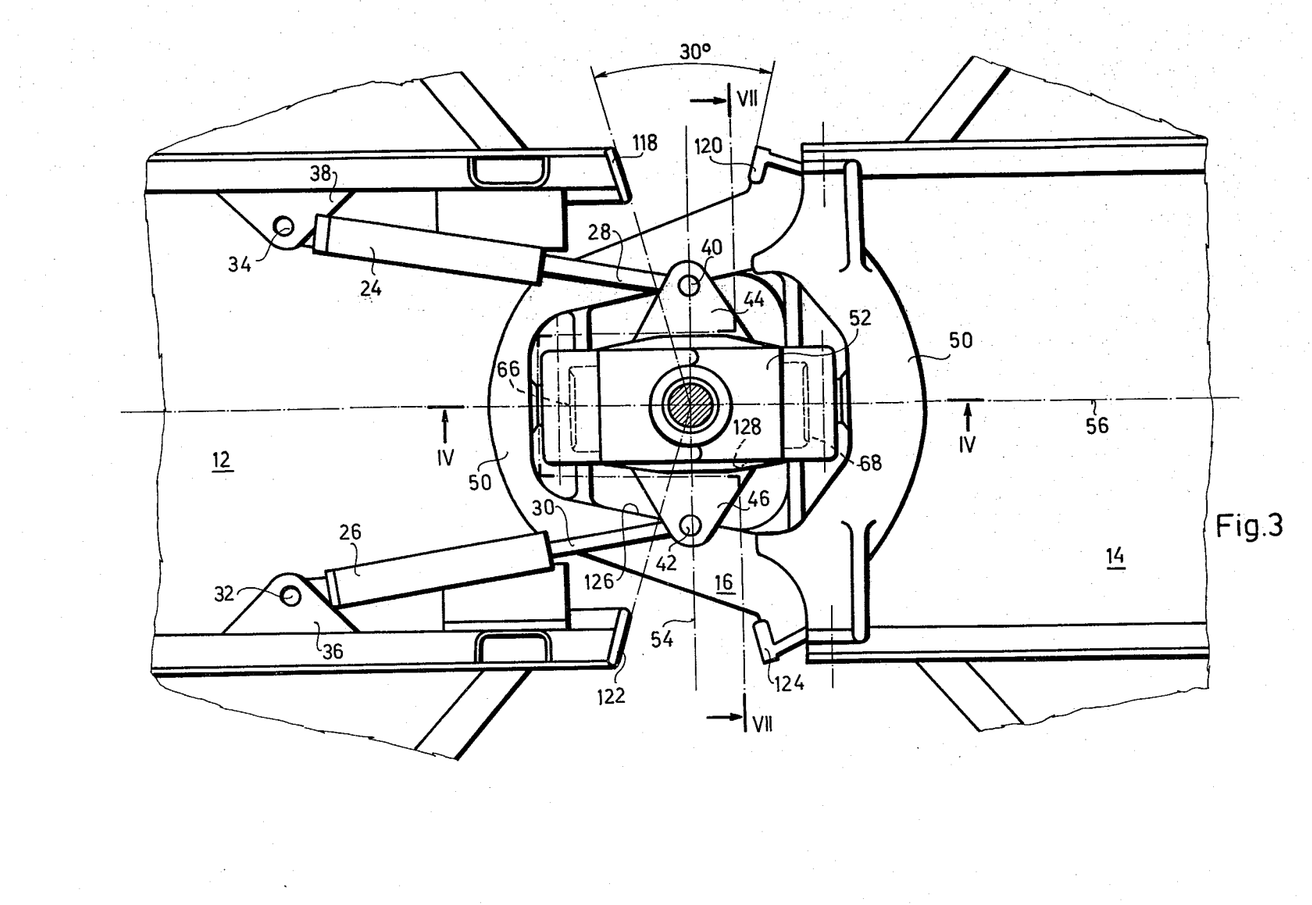
FIG. 3 represents a plan view of FIG. 2.

Abutment surfaces 118, 120, 122 and 124 pairwise arranged on front frame structure 12 and rear frame structure 14 set a limit to their mutual angular displacements about the vertical axis 54. This limit, in the instant case, is about 30° as is illustrated in FIG. 3. Similar abutment surfaces such as indicated at 126 and 128 may be provided to limit mutual angular displacements of the frame structures 12 and 14 about the horizontal axis 56.

Figure 7:
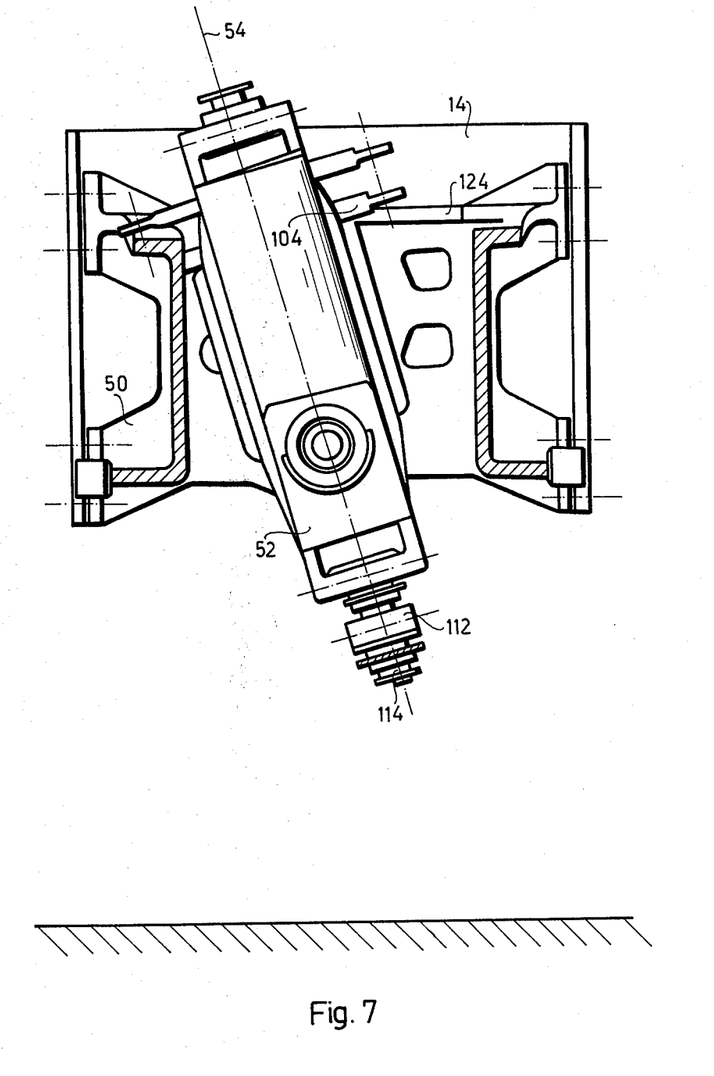
FIG. 7 illustrates a sectional view taken along line VII—VII in FIG. 3.

Referring now to the operation of the vehicles with particular reference to the hinge unit 16 between the frame structures 12 and 14, it may be assumed by way of example that the vehicle 10 is being steered straight ahead and its hinge unit 16 with adjacent parts of the frame structures 12 and 14 is disposed as shown in full lines in FIG. 3 of the drawings. As the vehicle 10 traverses irregular terrain and assuming, for example, that the right front wheel (not shown) drops into a depression relative to the other wheels, the front frame structure 12 will oscillate relative to the rear frame structure 14 about the horizontal longitudinally extending axis 56 through the virtual point of intersection 55. Such position is represented in FIG. 7. As the front wheel drops in this manner and the front frame section 12 oscillates, it will be appreciated that the intermediate member 52 of the hinge unit 16 performs but a simple angular displacement about the horizontal axis 56 in the counterclockwise direction as regards FIG. 7 without any action being exercised either on the steering jacks 24, 28 and 26, 30 or on the rear frame structure 14.

On the other hand, the frame structures 12 and 14 may be articulated horizontally relative to each other about vertical axis 54 which passes likewise through the virtual point of intersection 55. For steering manoeuvres, an extension and retraction of the steering jacks 24, 28 and 26, 30 is produced in response to turning of the nonrepresented steering wheel in the operator's cabin or compartment 18 whereby when the wheel is turned to the right with respect to an operator facing forwardly, the steering jacks will be operated to produce pivoting movement between the frame structures 12 and 14 so that the vehicle 10 will negotiate a right turn which means that steering jack 24, 28 is retracted while steering jack 26, 30 is extended. The amount of extension and retraction of the steering jacks 24, 28 and 26, 30 will also be dependent upon the amount of angular displacement or revolving movement of the aforesaid steering wheel. Therefore, the operator may control the articulated vehicle with respect to turning in the same manner as conventional vehicles by operating of a steering wheel so that gradual as well as sharp or acute cornering or turning may be accomplished. Obviously, the vertical axis 54 of all such mutual oscillations goe likewise through the virtual point of intersection 55 and, therefore, is without any influence as to mutual oscillations of the frame structures 12 and 14 around the horizontal axis 56.

Thus, due to the hinge unit 16 and its nature of a universal or cardan joint where all bearings are located on opposite sides of a common virtual point of intersection it is rendered possible that mutual oscillations of the frame structures caused by both traversing an irregular terrain and steering operations will take place independently of one another and at possibly short arms of forces which permits, in addition to a possibly reliable operation and compact design, optimum space requirements, light weight and corresponding low production costs.

What I claim is:

1. In a hinge unit for connecting a front frame structure and a rear frame structure of an articulated power vehicle permitting mutual angular displacement of said front frame structure and said rear frame structure about a vertical axis and about a horizontal axis, a front member connectable to said rear frame structure, and an intermediate member supported by a pair of bearings in said front member aligned along said vertical axis, and by a pair of bearings in said rear member aligned along said horizontal axis, the improvement in which the bearings of one of said pairs of bearings are on opposite sides of the axis of alignment of the bearings of the other pair of bearings, the front member carrying a traction bar arranged for pivotal movements around said vertical axis and connected to said rear frame structure.

2. In a hinge unit as claimed in claim 1 the further improvement of said vertical axis and said horizontal axis intersecting each other.

3. In a hinge unit as claimed in claim 1 said front member being integral with said front frame structure.

4. In a hinge unit for connecting a front frame structure and a rear frame structure of an articulated power vehicle permitting mutual angular displacement of said front frame structure and said rear frame structure about a vertical axis and about a horizontal axis, a front member connectable to said rear frame structure, and an intermediate member supported by a pair of bearings in said front member aligned along said vertical axis, and by a pair of bearings in said rear member aligned along said horizontal axis, the improvement in which the bearings of one of said pairs of bearings are on opposite sides of the axis of alignment of the bearings of the other pair of bearings, each bearing of each pair of bearings having clearance with its associated said member in both axial directions, the clearance of each bearing in one axial direction being of different magnitude from the clearance of the bearing in the other axial direction, the clearances of each said pair of bearings being arranged in mirror image relation to each other thereby to prevent both bearings of the same pair of bearings from being loaded by axial forces simultaneously.

* * * * *